US011209668B2

(12) United States Patent
Neuman

(10) Patent No.: US 11,209,668 B2
(45) Date of Patent: Dec. 28, 2021

(54) WEARABLE ITEM, HINGE ARRANGEMENT FOR WEARABLE ITEM AND METHOD OF MANUFACTURE

(71) Applicant: WIRES GLASSES LTD, London (GB)

(72) Inventor: Yair Neuman, London (GB)

(73) Assignee: WIRES GLASSES LTD, London (GB)

( * ) Notice: Subject to any disclaimer, the term of this patent is extended or adjusted under 35 U.S.C. 154(b) by 0 days.

(21) Appl. No.: 16/649,549

(22) PCT Filed: Sep. 21, 2018

(86) PCT No.: PCT/EP2018/075588
§ 371 (c)(1),
(2) Date: Mar. 20, 2020

(87) PCT Pub. No.: WO2019/057883
PCT Pub. Date: Mar. 28, 2019

(65) Prior Publication Data
US 2020/0285070 A1    Sep. 10, 2020

(30) Foreign Application Priority Data

Sep. 22, 2017   (GB) ..................... 1715376

(51) Int. Cl.
| | |
|---|---|
| G02C 5/00 | (2006.01) |
| B21F 45/00 | (2006.01) |
| B29D 12/02 | (2006.01) |
| G02C 5/06 | (2006.01) |
| G02C 5/12 | (2006.01) |
| G02C 5/22 | (2006.01) |

(52) U.S. Cl.
CPC ............ G02C 5/008 (2013.01); B21F 45/002 (2013.01); B29D 12/02 (2013.01); G02C 5/06 (2013.01); G02C 5/126 (2013.01); G02C 5/2254 (2013.01)

(58) Field of Classification Search
CPC ... G02C 1/00; G02C 5/08; G02C 5/06; G02C 5/126; G02C 5/2254; B29D 12/02; B29F 45/002
USPC ................ 351/41, 111, 114, 117, 158; 29/20
See application file for complete search history.

(56) References Cited

U.S. PATENT DOCUMENTS

| | | |
|---|---|---|
| 4,781,450 A | 11/1988 | Danloup |
| 5,351,099 A | 9/1994 | Winkler |
| 8,931,894 B1 * | 1/2015 | Chen ........................ G02C 1/10 351/106 |

(Continued)

FOREIGN PATENT DOCUMENTS

| | | |
|---|---|---|
| CN | 201725100 U | 1/2011 |
| DE | 20316953 U | 2/2004 |

(Continued)

*Primary Examiner* — Hung X Dang
(74) *Attorney, Agent, or Firm* — RC Trademark Company, LLC

(57) ABSTRACT

There is disclosed a wearable item. The wearable item includes at least one elongate member for supporting at least one attachable element. The elongate member is fabricated from an inner core that is surrounded by at least one outer layer. The at least one outer layer is elastic when strained by application of stress below a first elastic limit. The inner core is elastic when strained by application of stress below a second elastic limit or permanently deformed when strained by application of stress above the second elastic limit.

17 Claims, 7 Drawing Sheets

(56) References Cited

U.S. PATENT DOCUMENTS

2007/0236653 A1* 10/2007 Lee .......................... G02C 9/00
351/47
2015/0164195 A1    6/2015 Elliott

FOREIGN PATENT DOCUMENTS

| ES | 001077722 | | 9/2012 |
| FR | 001169874 | | 1/1959 |
| FR | 002588389 | | 4/1987 |
| FR | 2785058 | A1 | 4/2000 |
| GB | 0542876 | | 1/1942 |
| GB | 779472 | A | 7/1957 |
| JP | 2003255275 | | 4/1994 |
| WO | 2006/114837 | | 11/2006 |
| WO | 2009/077846 | A1 | 6/2009 |

* cited by examiner

WEARABLE ITEM, HINGE ARRANGEMENT FOR WEARABLE ITEM AND METHOD OF MANUFACTURE

TECHNICAL FIELD

The present disclosure relates generally to wearable items. Furthermore, the present disclosure relates to methods of manufacturing aforesaid wearable items. Moreover, the present disclosure relates to hinge arrangements that are useable for manufacturing aforementioned wearable items.

BACKGROUND

Generally, wearable items and accessories are used by people for functional purposes and/or fashionable applications. Examples of wearable items include, but are not limited to, watches, spectacles, bracelets, and jewelry. Furthermore, wearable items such as spectacles are worn by a given user for functional purposes, such as, to compensate for eye defects, as protective eyewear, for entertainment purposes (3D glasses, head-mounted displays and so forth) and suchlike. Moreover, wearable items such as bracelets or jewelry are worn by a given user for fashionable purposes.

Typically, wearable items employ various parts that are required to have relative movement with respect to each other. For example, arms (or temples) of a pair of spectacles frame are required to provide relative movement with respect to the spectacle frame, and straps of a watch are required to provide relative movement with respect to a case of the watch. Conventionally, hinges are provided to enable such relative movement between various parts of wearable items. For example, parts that are connected using hinges may be used for folding and unfolding of the wearable items, such as, for purposes of storage and use respectively.

Generally, hinges are implemented by using various components, such as, moving components, mating components, rotating components, screws, pins, and so forth. Furthermore, the hinges that are employed in wearable items are required to have a small form factor. It will be appreciated that employing moving components in a small form factor causes wear and tear of the components due to friction therebetween. Moreover, the hinges that use small components such as pins, screws and so forth are prone to rusting. Furthermore, it is difficult to make small components robust to excess force when in use, for example being sat upon or dropped onto a hard floor surface. It will be appreciated that such drawbacks associated with wear and tear, robustness and rusting of components of conventional hinges may lead to a short operating life of the wearable item due to failure of the various components. Additionally, the hinges implemented using such components introduce unwarranted complexities in the wearable items (such as, during production, use or repair thereof).

Moreover, a given wearable item, such as a pair of spectacle frame or a watch may not be suitable for different types of users. Specifically, such wearable item may have to be customized to fit as per required dimensions of a specific user (such as, based on width of head of the given user or circumference of wrist thereof). It will be appreciated that additional costs may be accrued by a user for such customization of the wearable item, or the wearable item may be deemed unusable. Furthermore, in case of minor issues arising with a wearable item, such as, detachment of a lens or a nose pad from a pair of spectacle frames, a given user may be required to spend a substantial amount for acquiring repair services of a professional. It will be appreciated that conventional wearable items do not enable convenient repair of such minor issues. In addition, conventional manufacturing techniques employed for manufacture of such parts may be particularly wasteful with respect to manufacturing materials.

Therefore, in light of the foregoing discussion, there exists a need to overcome the aforementioned problems associated with conventional wearable items.

In a published German utility model patent (Gebrauchsmusterschrift) DE20316953U1 (Proprietor: Gunter Wied), there is described a continuous hinge arrangement including an inner core of deformable material surrounded by metal components. The inner core is fabricated, for example, from a polymeric material, for example from a plastics material, that is permanently deformable when subjected to excess stress. The continuous hinge arrangement is described as useable in spectacles.

In a published United Kingdom patent application GB779472A, there are described improvements pertaining to spectacle frames, wherein the spectacle frames are fabricated from steel wire that is coated in indiarubber or a plastics material. When the steel wire is sufficiently stressed, the wire can be permanently deformed to acquire a desired shape.

SUMMARY

The present disclosure seeks to provide an improved wearable item, for example spectacles, watchstraps, bracelets, and jewelry.

The present disclosure also seeks to provide an improved method of manufacturing a wearable item.

Furthermore, the present disclosure seeks to provide an improved hinge arrangement for a wearable item.

According to a first aspect, an embodiment of the present disclosure provides a wearable item that includes at least one elongate member for supporting at least one attachable element, characterized in that the elongate member is fabricated from an inner core that is surrounded by at least one outer layer, (i) wherein the at least one outer layer is elastic when strained by application of a stress below a first elastic limit, wherein the at least one outer layer experiences a permanent deformation when strained by application of a stress above the first elastic limit; and (ii) wherein the inner core is elastic when strained by application of a stress below a second elastic limit, and permanently deformed when strained by application of a stress above the second elastic limit.

The present disclosure seeks to provide an improved, cost-effective and reliable wearable item that substantially overcomes various drawbacks associated with conventional wearable items.

Optionally, the at least one outer layer includes at least one gap radially arranged on the elongate member.

Optionally, the at least one gap is formed between a first element and a second element of the at least one outer layer that are coupled in a mutually pivotal manner using the inner core, wherein torsional adjustment of the inner core enables pivotal movement of the second element and the first element.

Optionally, one or more abutting ends of the first element and/or the second element are configured (namely operable) to slip rotationally with respect to the inner core for accommodating torsional adjustment of the inner core.

More optionally, the inner core is strained by application of stress for enabling the wearable item to be at least one of: worn by a user, stored in a folded state, unfolded for use.

Yet more optionally, the at least one elongate member is strained by the application of the stress above the first elastic limit and the second elastic limit for at least one of: fabricating the wearable item, adapting the wearable item for the user, repairing the wearable item.

Optionally, the inner core has a diameter D, and the at least one outer layer has a thickness T, characterized in that T is in a range of 0.25 D to 3.0 D, more optionally in a range of 0.5 D to 2.0 D, more optionally in a range of 0.1 D to 0.8 D.

Optionally, the inner core is implemented as a bundle of a plurality of elongate components.

Optionally, the at least one outer layer is tubular.

Optionally, one or more characteristics of the at least one outer layer vary along a length of the elongate member, wherein the one or more characteristics include at least one of:
  (i) a flexibility of the at least one outer layer;
  (ii) a thickness of the at least one outer layer;
  (iii) a material composition of the at least one outer layer; and
  (iv) a cross-section of the at least one outer layer.

More optionally, at least one of the inner core and the at least one outer layer is fabricated from a hyperelastic metal alloy and/or a flexible polymeric material.

Yet more optionally, the wearable item is implemented as a pair of spectacles including the at least one attachable element implemented as a pair of lenses for left and right eyes of a user, and a frame for supporting the pair of lenses, wherein the frame includes arms that are configured to engage onto ears (pinna) of the user, characterized in that:
  (i) the frame is fabricated from the elongate member;
  (ii) the elongate member is formed to support the lenses at a lower and/or upper peripheral edge of the lenses, wherein at least a portion of the peripheral edge of the lenses is supported by the frame; and
  (iii) the elongate member is formed into an upward arch at a region of the pair of spectacles that are supported by a nose of the user when the pair of spectacles is being worn by the user.

Optionally, the lenses are attachable onto the frame in a detachable clip-on manner.

Optionally, the pair of spectacles includes a nose pad support arrangement that is attachable onto the frame in a detachable clip-on manner.

Optionally, the elongate member includes the inner core implemented as a unitary component.

Optionally, the at least one outer layer is implemented as a unitary component.

According to a second aspect, an embodiment of the present disclosure provides a method of manufacturing a wearable item including at least one elongate member for supporting at least one attachable element, characterized in that the method includes:
  (i) fabricating the elongate member from an inner core; and
  (ii) arranging at least one outer layer to surround the inner core;
wherein:
(a) the at least one outer layer is elastic when strained by application of a stress below a first elastic limit, wherein the at least one outer layer experiences a permanent deformation when strained by application of a stress above the first elastic limit; and (b) the inner core is elastic when strained by application of a stress below a second elastic limit, and permanently deformed when strained by application of a stress above the second elastic limit.

Optionally, the method further includes:
(iii) forming at least one gap on the at least one outer layer, wherein the at least one gap is radially arranged on the elongate member.

Optionally, the method includes forming the at least one gap between a first element and a second element of the at least one outer layer that are coupled in a mutually pivotal manner using the inner core, wherein torsional adjustment of the inner core enables pivotal movement of the second element and the first element.

Optionally, the method includes straining the inner core by application of stress for enabling the wearable item to be at least one of: worn by a user, stored in a folded state, unfolded for use.

Optionally, the method includes straining the at least one elongate member by the application of the stress above the first elastic limit and the second elastic limit for at least one of: fabricating the wearable item, adapting the wearable item for the user, repairing the wearable item.

Optionally, the inner core has a diameter D, and the at least one outer layer has a thickness T, characterized in that T is in a range of 0.25 D to 3.0 D, more optionally in a range of 0.5 D to 2.0 D, more optionally in a range of 0.1 D to 0.8 D.

Optionally, the inner core is implemented as a bundle of a plurality of elongate components.

Optionally, the at least one outer layer is tubular.

Optionally, one or more characteristics of the at least one outer layer vary along a length of the elongate member, wherein the one or more characteristics include at least one of:
  (i) a flexibility of the at least one outer layer;
  (ii) a thickness of the at least one outer layer;
  (iii) a material composition of the at least one outer layer; and
  (iv) a cross-section of the at least one outer layer.

Optionally, the method includes fabricating at least one of the inner core and the at least one outer layer from a hyperelastic metal alloy and/or a flexible polymeric material.

Optionally, the method includes implementing the wearable item as a pair of spectacles including the at least one attachable element implemented as a pair of lenses for left and right eyes of a user, and a frame for supporting the pair of lenses, wherein the frame includes arms that are configured to engage onto ears (pinna) of the user, characterized in that:
  (i) the frame is fabricated from the elongate member;
  (ii) the elongate member is formed to support the lenses at a lower and/or upper peripheral edge of the lenses, wherein at least a portion of the peripheral edge of the lenses is supported by the frame; and
  (iii) the elongate member is formed into an upward arch at a region of the pair of spectacles that are supported by a nose of the user when the pair of spectacles is being worn by the user.

More optionally, the method includes attaching the lenses onto the frame in a detachable clip-on manner.

Yet more optionally, the pair of spectacles includes a nose pad support arrangement that is attachable onto the frame in a detachable clip-on manner.

Optionally, the elongate member includes an inner core implemented as a unitary component.

According to a third aspect, an embodiment of the present disclosure provides a hinge arrangement for a wearable item, characterized in that the hinge arrangement includes an inner core surrounded by at least one outer layer, (i) wherein the at least one outer layer is elastic when strained by application of a stress below a first elastic limit, wherein the at least one outer layer experiences a permanent deformation when strained by application of a stress above the first elastic limit; and (ii) wherein the inner core is elastic when strained by application of a stress below a second elastic limit, and permanently deformed when strained by application of a stress above the second elastic limit.

Optionally, the at least one outer layer includes a first element and a second element, wherein the inner core is configured to connect the first element and the second element in a mutually pivotal manner.

Optionally, at least one gap is formed between mutually abutting ends of the first element and the second element.

More optionally, one or more abutting ends of the first element and/or the second element are configured (namely operable) to slip rotationally with respect to the inner core for accommodating torsional adjustment of the inner core.

Yet more optionally, the inner core is implemented as a unitary component.

Optionally, the inner core is implemented as a bundle of a plurality of elongate components.

Optionally, the elongate components of the inner core are configured to change their relative positions as the hinge arrangement is pivotally adjusted in use.

Optionally, the at least one outer layer is implemented as a unitary component.

Optionally, the at least one outer layer is implemented as a series of a plurality of components along a length of the inner core.

More optionally, one or more characteristics of the plurality of components vary along a length of the inner core, wherein the one or more characteristics include at least one of:
  (i) a flexibility of the at least one outer layer;
  (ii) a thickness of the at least one outer layer;
  (iii) a material composition of the at least one outer layer; and
  (iv) a cross-section of the at least one outer layer.

Yet more optionally, at least one of the inner core and the at least one outer layer is fabricated from a hyperelastic metal alloy and/or a flexible polymeric material.

Optionally, the wearable item includes at least one of: a pair of spectacles, a bracelet, a watch, an item of jewelry.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS

In overview, embodiments of the present disclosure are concerned with wearable items. Furthermore, embodiments of the present disclosure are concerned with methods of manufacturing the aforesaid wearable items. Moreover, embodiments of the present disclosure are concerned with hinge arrangements for wearable items.

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Figure 1:
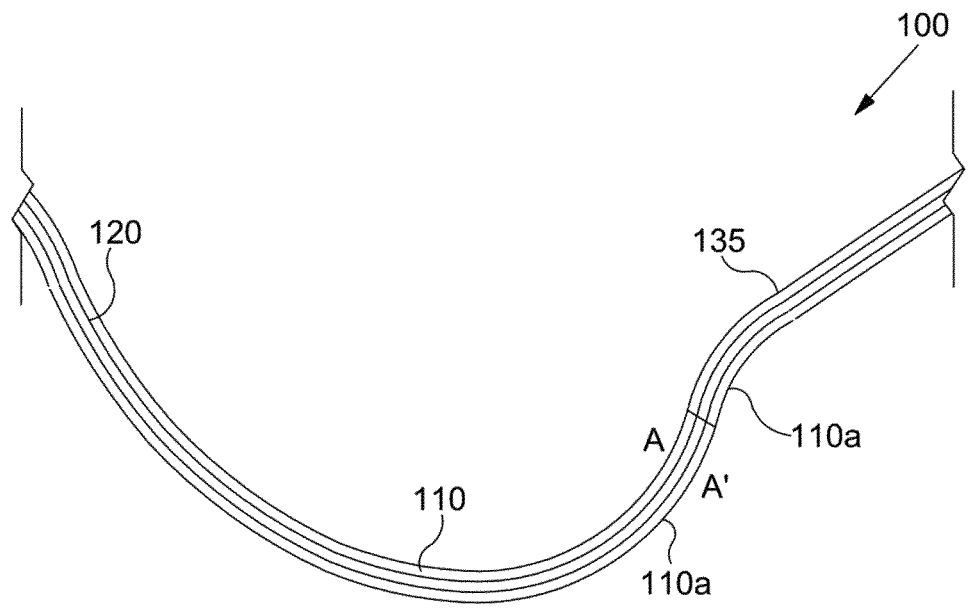
FIG. 1 is an illustration of a hinge arrangement for a wearable item, in accordance with an embodiment of the present disclosure.

Referring to FIG. 1, there is shown a hinge arrangement 100 for a wearable item 110 in accordance with an embodiment of the present disclosure. As shown, the hinge arrangement 100 includes an inner core 120 surrounded by at least one outer layer 130. For example, the at least one outer layer 130 is implemented as a hollow tubular (or cylindrical) structure that accommodates the inner core 120 implemented as a solid cylindrical structure therein. In such an example, a diameter of the inner core 120 is smaller than an inner diameter of the at least one outer layer 130. In another example, the outer layer 130 is implemented as a plurality of mutually concentric layers (having same or different thickness with respect to each other) arranged on the inner core 120. Moreover, the at least one outer layer 130 is elastic when strained by application of stress below a first elastic limit. For example, the hinge arrangement 100 is implemented in the wearable item 110 such that the outer layer 130 is required to be strained (such as, by bending, twisting, rotating and so forth) to enable relative movement between two or more portions of the wearable item 110. In such an example, stress is applied along a hinge point (represented by a dotted line A-A' in FIG. 1) to strain the outer layer 130 to enable such relative movement between the two or more portions. Furthermore, such applied stress is lower than an elastic limit (such as the first elastic limit) of a material that is used to fabricate the outer layer 130. It will be appreciated that when such applied stress is lower than the first elastic limit of the outer layer 130, the outer layer 130 restores to an original state (such as an unbent or untwisted state) upon removal of the applied stress therefrom.

In one embodiment, the at least one outer layer 130 experiences a permanent deformation when strained by application of stress above the first elastic limit. For example, the wearable item 110 is required to retain the strained state (such as a bent, twisted or rotated state) subsequent to removal of applied stress from the outer layer 130. In such an example, a stress applied on the outer layer 130 is more than the first elastic limit of the outer layer 130. Furthermore, such application of stress enables permanent (or plastic) deformation of the outer layer 130 along a point of application of stress (such as the hinge point), thereby enabling the wearable item 110 to retain the strained state.

Furthermore, the inner core 120 is elastic when strained by application of a stress below a second elastic limit. For example, the hinge arrangement 100 is implemented in the wearable item 110 to connect pivotally two or more portions of the wearable item 110 that are required to have relative movement with respect to each other. In such an example, a user of the wearable item 110 is required to apply stress on the inner core 120 along a hinge point (represented by a dotted line A-A' in FIG. 1) for causing the relative movement between the two or more portions. In one example, the hinge arrangement 100 is implemented in the wearable item 110 to enable relative movement between two portions 110*a* and 110*b* along A-A'. In such an example, the relative movement is achieved by holding one of the portions, such as the portion 110*a*, in a stationary state and applying stress on another portion, such as the portion 110*b* to move it along A-A'. Furthermore, such application of stress on the portion 110*b* causes straining of the inner core 120 (and the outer layer 130), such as, due to twisting or bending thereof.

Moreover, when the stress applied on the inner core 110 is below the second elastic limit thereof, the inner core 110 is configured to maintain its flexibility without experiencing any permanent deformation. Removal of the applied stress from the second portion 110*b* restores the two portions 110*a* and 110*b* to an original state (and/or position) thereof.

Moreover, the inner core 120 is permanently deformed when strained by application of stress above the second elastic limit. For example, a stress is applied on the portion 110*b* to retain it in a bent state along A-A'. In such an example, the applied stress is more than the second elastic limit of the inner core 120 (and the at least one outer layer 130 surrounding the inner core 120). Such application of stress causes permanent deformation of the inner core 120 and enables to retain the hinge arrangement 100 in a required state.

According to an embodiment, the inner core 120 is implemented as a unitary component. For example, a length of the inner core 120 is the same as a distance along the wearable item 110 between distal ends thereof. In such an example, the wearable item 110 is fabricated by arranging the inner core 120 through an entire length of the wearable item 110 (such as, through a central cavity of the wearable item 110). In one example, the inner core 120 is implemented as a wire having a same length as distance along the wearable item 110 between distal ends thereof. Furthermore, a diameter of such wire is smaller or substantially same as an inner diameter of the outer layer 130. In such an example, the wearable item 100 is fabricated by arranging the wire through a central cavity of the outer layer 130. By "sub-stantially same" is to be construed to be in a range of 95% to 100%, more optionally in a range of 98% to 100%.

In an embodiment, the inner core 120 is implemented as a bundle of a plurality of elongate components. For example, the plurality of elongate components is implemented as wires that are arranged in a parallel configuration with respect to each other and along the wearable item 110. In such an example, the plurality of wires is arranged through a central cavity of the outer layer 130 along the wearable item 110. Optionally, the plurality of elongate components is arranged together in a twisted state, wherein the elongate components are helically twisted about a central axis (such as, about a central axis of the outer layer 130). Alternatively, the plurality of elongate components is arranged together in an untwisted state, such as, wires that are arranged in a parallel configuration with respect to each other along the wearable item 110. Optionally, the plurality of elongate components is arranged together in a plaited state.

In an embodiment, the elongate components of the inner core 120 change their relative positions, when in operation, as the hinge arrangement 100 is pivotally adjusted in use. For example, the elongate components of the inner core 110 slip with respect to each other when stress is applied on the inner core 120. Furthermore, the change in relative positions of the elongate components is restored, such that the elongate components return to their original positions, when the applied stress is below the second elastic limit. For example, the elongate components are implemented as a cylindrical bundle including one elongate component at a centre of the bundle. In such an example, when stress is applied on the inner core 120, the stress being less than the second elastic limit of the inner core 120, the elongate components slip about the central elongate component. Furthermore, when the applied stress is removed and subsequently, an equal and opposite stress is applied on the inner core 120, the elongate components return to their original positions with respect to the central elongate component.

In one embodiment, the at least one outer layer 130 is implemented as a unitary component. For example, the wearable item is fabricated such that a total length of the outer layer 130 is same as distance along the wearable item 110 between distal ends thereof. Optionally, when the inner core 120 is also implemented as the unitary component (as explained herein above), the length of outer layer 130 is substantially same as the total length of the inner core 120.

In an embodiment, at least one of the inner core 120 and the at least one outer layer 130 is fabricated from a hyperelastic metal alloy and/or a flexible polymeric material. For example, the inner core 120 is fabricated from substantially elastic spring steel, for example Carbon spring steel, stainless steel or similar. In another example, the outer layer 130 is fabricated using metal or metal alloy, including but not limited to, brass, Aluminium, Aluminium alloy, Titanium, Titanium alloy, oxygen-free Copper, Indium alloys (such as Nickel-Indium alloys), enamel-coated Copper; using plastic materials; using a hyperelastic metal alloy, such as ElastaMet™ hyperelastic single crystal metal alloy; and/or using a polymer, including, but not limited to, polypropylene, silicone, polyethylene, nylon, polyvinylchloride (PVC), or a radiation-hardened polymeric material.

Figure 2:
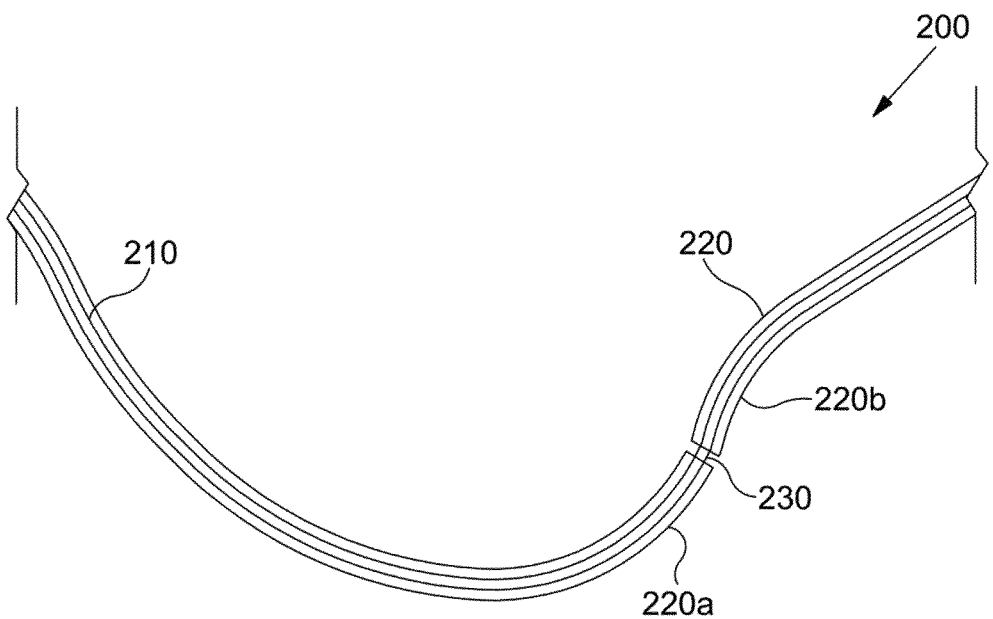
FIG. 2 is an illustration of a hinge arrangement, in accordance with an embodiment of the present disclosure.

Referring to FIG. 2, there is shown a hinge arrangement 200 (such as the hinge arrangement 100 of FIG. 1), in accordance with another embodiment of the present disclosure. The hinge arrangement 200 includes an inner core 210 (such as the inner core 120 of FIG. 1) surrounded by at least one outer layer 220 (such as the at least one outer layer 130 of FIG. 1). As shown, the outer layer 220 includes a first element 220a and a second element 220b, wherein the inner core 210 connects, when in operation, the first element 220a and the second element 220b in a mutually pivotal manner. For example, the hinge arrangement 200 enables a relative movement (such as rotation, twisting or bending movement) between the first element 220a and the second element 220b. In such an example, the first element 220a is held in a stationary state and stress is applied on the second element 220b to cause such relative movement. Furthermore, the stress applied on the second element 220b causes straining (such as bending) of the inner core 210 along a strain portion, such as, along a region between the first element 220a and the second element 220b. Such straining of the inner core 210 enables a pivotal movement between the first element 220a and the second element 220b to be achieved. Alternatively, the second element 220b is held in a stationary state and stress is applied on the second element 220a to cause the relative movement. It will be appreciated that, for a twisting motion of the first element 220a relative to the second element 220b, a torsional strain of the inner core 210 causes the strain portion of the inner core 210 to extend into the first element 220a relative to the second element 220b, so that the strain portion is not merely concentrated at the region between the first element 220a and the second element 220b; when the first element 220a abuts onto the second element 220b, the region therebetween becomes negligibly small.

According to one embodiment, at least one gap 230 is formed between mutually abutting ends of the first element 220a and the second element 220b. For example, the gap 230 is formed by separation (such as, by cutting) of the at least one outer layer 220 along a circumference thereof corresponding to a required length of the gap 230. Furthermore, the length of the gap 230 (such as length along axis of the outer layer 220) is selected to prevent contact between the mutually abutting ends of the first element 220a and the second element 220b during relative movement therebetween. Moreover, such a length of the gap 230 is substantially smaller than a total length of the outer layer 220 (and/or the inner core 210). Such a gap 230 enables a convenient pivotal movement between the first element 220a and the second element 220b to be achieved, without an application of substantial stress on the outer layer 220 due to the stress applied on the inner core 210. Furthermore, such reduction of stress applied on the outer layer 220 enables to reduce work-hardening thereof and further enables to improve operating life of a wearable item including the hinge arrangement 200.

In an embodiment, one or more abutting ends of the first element 220a and/or the second element 220b slip rotationally, when in operation, with respect to the inner core 210 for accommodating a torsional adjustment of the inner core 210. For example, when stress is applied on the hinge arrangement 200 to cause relative movement between the first element 220a and the second element 220b, a strain is experienced by the inner core 210 causing bending thereof. Furthermore, such a stress applied on the hinge arrangement 200 potentially causes strain to be experienced by the outer layer 220, such as, at regions near abutting ends of the first element 220a and the second element 220b. Moreover, when the outer layer 220 is fabricated using a material having lower flexibility as compared to the inner core 210, work-hardening is experienced by the outer layer 220 that potentially causes failure of the wearable item during prolonged use thereof. In such an example, one or more abutting ends of the first element 220a and/or the second element 220b slip rotationally, when in operation, with respect to the inner core 210. Such slipping of the abutting ends of the first element 220a and/or the second element 220b enables adjustment thereof based on the applied stress.

Furthermore, the adjustment of the abutting ends due to slippage enables a reduction of strain experienced by the first element 220a and/or the second element 220b during torsional adjustment of the inner core 210. Additionally, subsequent to torsional adjustment of the inner core 210, slipping of the abutting ends of the first element 220a and/or the second element 220b enables the inner core 210 to be slightly relieved of the strain experienced by slipping of the inner core 210 relative to the abutting ends of the first element 220a and/or the second element 220b. It will be appreciated that relieving the strain applied on the inner core 210 enables an operating life of the inner core 210 and consequently, the wearable item, to be increased.

According to an embodiment, the at least one outer layer 220 is implemented as a series of a plurality of components along a length of the inner core 210. For example, the outer layer 220 is implemented as a tubular structure including a plurality of tubular structures that are connected end-to-end with each other. Furthermore, such plurality of tubular structures may comprise gaps (such as the gap 230) therebetween. In one example, the tubular structures include a gap between each pair of the plurality of tubular structures.

In one embodiment, one or more characteristics of the plurality of components vary along a length of the inner core 210, wherein the one or more characteristics include at least one of a flexibility of the at least one outer layer 220, a thickness of the at least one outer layer 220, a material composition of the at least one outer layer 220, and/or a cross-section of the at least one outer layer 220. For example, the components that are arranged near the gap 230 have, when in operation, a relatively higher flexibility as compared to other components that are farther therefrom. It will be appreciated that the components that are arranged near the gap 230 will be subjected to increased stress (due to bending of the inner core 210) as compared to the other components. In such an example, the increased flexibility enables the components to return to their original state upon removal of the applied stress. In another example, the plurality of components is fabricated to have different thicknesses with respect to each other, such as, the components are fabricated to have greater thickness near the gap 230 as compared to distal ends of the wearable item. The components near the gap 230 are subjected to increased stress as compared to the other components, thereby causing increased wear and tear thereof during prolonged use of the wearable item. In such an example, the increased thickness of the components near the gap 230 enables effects of such wear and tear to be substantially reduced, thereby, enabling continuous operation of the wearable item. In yet another example, the plurality of components is fabricated using different materials, such as, using metals, metal alloys, plastics and/or polymeric materials. In yet another example, the plurality of components is fabricated to have different material composition with respect to each other, such as, the components near the gap 230 are fabricated using a material having higher elastic limit (and yield stress) as compared to other components of the wearable item. Such a higher elastic limit enables the components near the gap 230 substantially to absorb stress applied thereon, without experiencing irregular permanent deformation (such as, when the stress applied on the inner core 210 is below the elastic limit thereof). In one example, the plurality of components is fabricated to have different cross-sections with respect to each other. For example, the inner core 210 is fabricated to have a varying thickness along the wearable item. In such an example, the components are fabricated to have different cross-sections to enable the inner core 210 to be accommodated therein. Optionally, the components are fabricated to have different cross-sections with respect to each other based on a design of the wearable item (such as, the components are fabricated to taper towards the distal ends of the wearable item).

In one embodiment, the wearable item includes at least one of a pair of spectacles, a bracelet, a watch, or an item of jewelry. For example, the wearable item is implemented as a pair of spectacles wherein the first element 220a is formed by a frame of the pair of spectacles and the second element 220b is formed by temples (arms) of the pair of spectacles. In another example, the wearable item is implemented as a wristwatch, wherein the first element 220a is formed by a case (including a dial, hands and so forth) of the wristwatch and the second element 220b is implemented as straps of the wristwatch. It will be appreciated that the hinge arrangement 200 included in such wearable items enables pivotal connection between elements that are required to have relative movement therebetween.

Figure 3A:
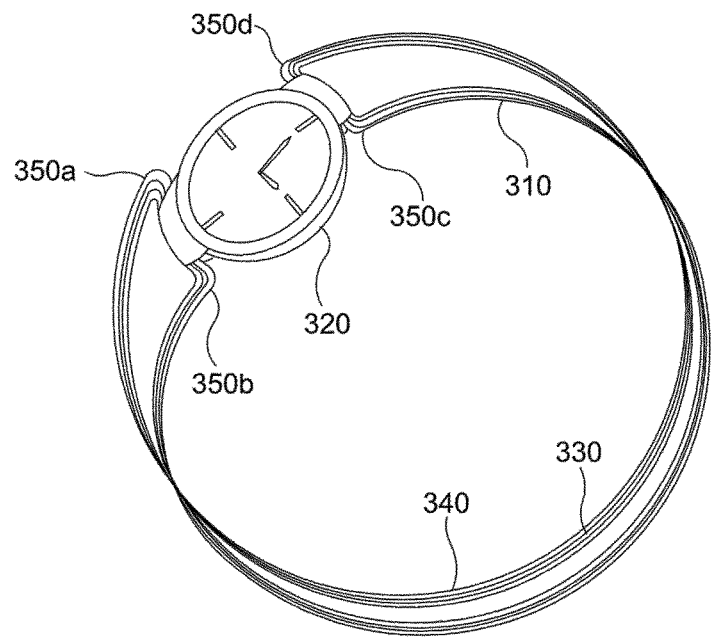
FIGS. 3A, 3B, 4, 5, 6, 7, 8, 9, 10A and 10B are illustrations of exemplary wearable items, in accordance with various embodiments of the present disclosure.
Figure 4:
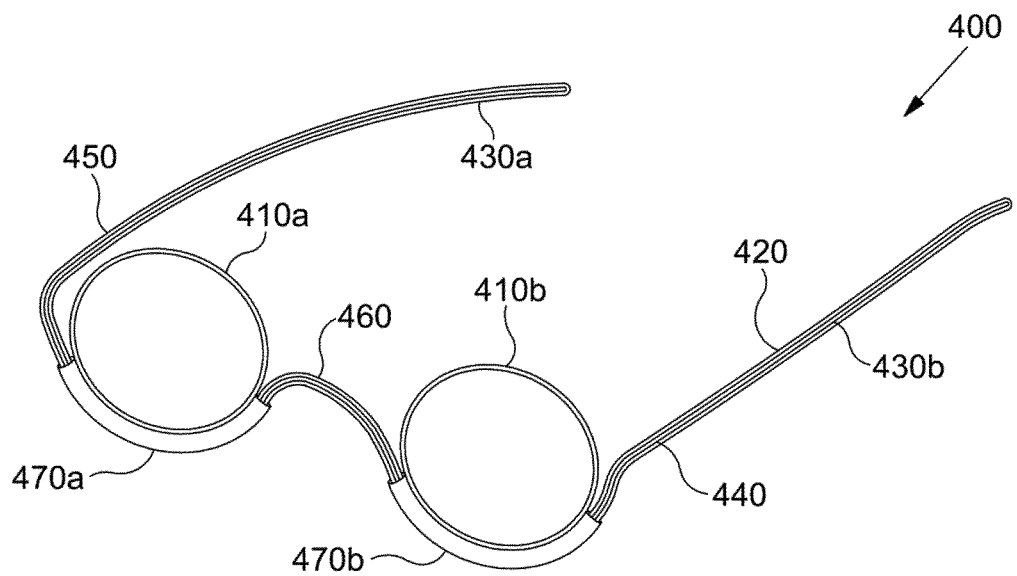
Figure 5:
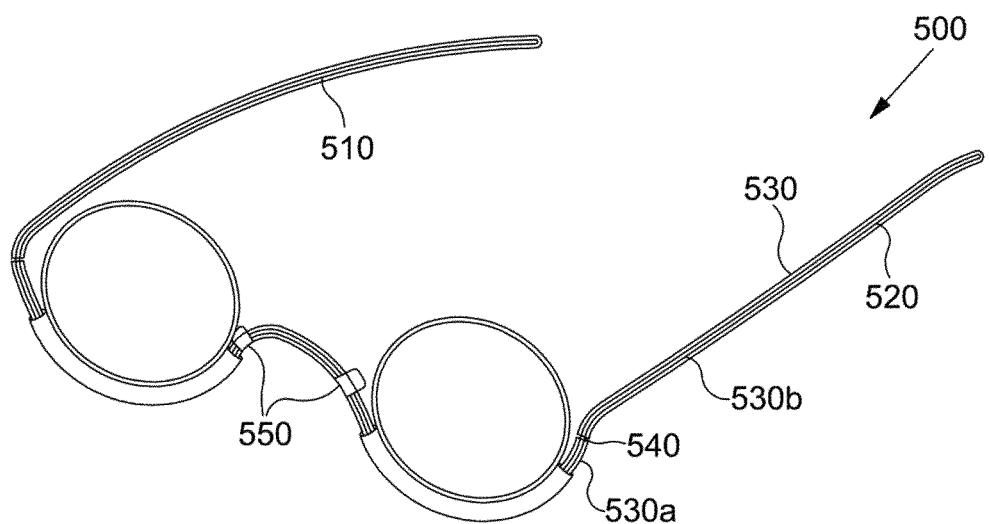

Referring to FIG. 3A, there is shown an exemplary wearable item 300, in accordance with an embodiment of the present disclosure. As shown, the wearable item 300 is implemented as a wrist-wearable item, such as a wristwatch. In one example, the wearable item 300 includes an activity tracker, a jewelry item such as a bracelet, and so forth. The wearable item 300 includes at least one elongate member 310 supports at least one attachable element 320. As shown, the elongate member 310 forms a structure of the wearable item 300 that is fastened onto a wrist of a user. Furthermore, the at least one attachable element 320, supported on the elongate member 310, forms a primary functional and/or ornamental component of the wearable item 300. For example, when the wearable item 300 is implemented as the wristwatch, wherein the attachable element 320 is a case that includes a dial or face, hands, crystals and so forth of the wristwatch. In another example, when the wearable item 300 is implemented as the bracelet, the attachable element 320 forms an ornamental element (such as a pendant) thereof. In such examples, the elongate member 310 forms a strap (or chain) of the wearable item that is fastened onto a wrist of a user. It will be appreciated that although FIG. 3A (and FIG. 3B) depicts the wearable item 300 implemented as the wrist-wearable item, other implementations are also possible without departing from a scope of the present disclosure. For example, the wearable item 300 is implemented as at least one of a necklace, a pair of spectacles (as shown in FIGS. 4 and 5), an arm band and so forth.

Furthermore, the elongate member 310 is fabricated from an inner core 330 (such as the inner core 120 of FIG. 1) that is surrounded by at least one outer layer 340 (such as the outer layer 130 of FIG. 1), for example a single outer layer or a plurality of outer layers, for example a plurality of concentric outer layers. For example, the inner core 330 is implemented as a solid structure, such as a wire, a solid cylinder and so forth, fabricated in a shape of the wearable item 300. In one embodiment, the elongate member 310 includes the inner core 330 implemented as a unitary component. For example, the inner core 330 is fabricated such that it extends through the elongate member 310 between distal ends thereof. In such an example, a length of the inner core 330 is substantially the same as length of the elongate member 310; by "substantially the same" is within a range of 90% to 110%, more optionally in a range of 95% to 105%, and yet more optionally in a range of 98% to 102%. In an embodiment, the inner core 330 is implemented as a bundle of a plurality of elongate components. For example, the plurality of elongate components is implemented as wires that are arranged in parallel with respect to each other. Optionally, the plurality of elongate components is arranged together in a twisted state, wherein the elongate components are helically twisted about a central axis (such as an axis passing through centre of the wearable item 300). Alternatively, the plurality of elongate components is arranged together in an untwisted state, for example, as wires that are arranged in a parallel configuration with respect to each other along the wearable item 300. Yet alternatively, the plurality of elongate components is arranged together in a plaited state.

Furthermore, the outer layer 340 accommodates the inner core 330 therein, such as, to envelop completely the inner core 330. In one embodiment, the at least one outer layer 340 is tubular. For example, when the inner core 330 is implemented as a wire or a solid cylinder and the outer layer 340 is implemented to have a tubular structure.

Furthermore, the outer layer 340 has an inner diameter that is bigger than or substantially the same (wherein "substantially the same" is defined above) as an outer diameter of the inner core 330. Moreover, the outer layer 340 is associated with a thickness, such as, a difference between an outer diameter and an inner diameter thereof. For example, the outer layer has an outer diameter of 2 mm and an inner diameter of 1 mm, with the inner core 330 having a diameter of 1 mm. In such an example, the outer layer 340 is associated with a thickness of 1 mm. In one embodiment, the inner core 330 has a diameter D, and the at least one outer layer 340 has a thickness T, characterized in that T is in a range of 0.25 D to 3.0 D, more optionally in a range of 0.5 D to 2.0 D, more optionally in a range of 0.1 D to 0.8 D.

The at least one outer layer 340 is elastic when strained by an application of a stress below a first elastic limit. For example, the wearable item 300 is implemented without an attachment arrangement for opening and/or closing the wearable item, such as, to enable attachment thereof to a wrist of a user. In such an example, a shape of the elongate member 310 is required to be modified, such as, expanded or bent at regions 350a-d, to enable such attachment of the wearable item 300 with the user's wrist. Furthermore, when in use, the user applies stress on the outer layer 340 at the regions 350a-d of the wearable item 300, wherein the applied stress is lower than the first elastic limit of the outer layer 340. Moreover, upon attachment of the wearable item 300 on the user's wrist (such as, by slipping the user's hand into an opening formed by the expanded elongate member 310), the user removes the applied stress. It will be appreciated that due to the applied stress being lower than the first elastic limit of the outer layer 340, the wearable item 300 is restored to an original state thereof (such as, by contraction of the outer layer 340) and consequently, to enable attachment of the wearable item 300 to the user's wrist.

The inner core 330 is elastic when strained by application of a stress below a second elastic limit. For example, the wearable item 300 is required to be opened (such as, expanded) to enable a user thereof to wear the wearable item 300. In such an example, the user applies stress on the wearable item 300 at regions 350a-d (such as, regions including a hinge arrangement, such as the hinge arrangement 100 of FIG. 1). Such an application of stress enables relative movement between the elongate member 310 and the attachable element 320, causing strain on the wearable item 300 at the regions 350a-d. Furthermore, the strain on the wearable item 300 causes tensioning or bending of the inner core 330 at the regions 350a-d. Moreover, when the applied stress is less than the second elastic limit of the inner core 330, the wearable item 300 is restored to an original state thereof (such as, the bending disappears) when the applied stress is removed. For example, the user may wish to restore the wearable item 300 to an original state thereof, such as, for storage of the wearable item 300. In such an example, the stress applied on the inner core 330 (and the outer layer 340) is removed, thereby, enabling the inner core 330 (and the outer layer 340) to be unbent. Thus, subsequently, the wearable item 300 can be restored to its original state by applying an equal and opposite stress on the inner core 330 (and the outer layer 340).

Optionally, the wearable item 300 includes a hook (not shown) arranged on the elongate member 310. The hook enables to maintain the wearable item 300 in the folded state when stored, such as, to prevent elasticity of the inner core 330 causing unfolding or expanding of the wearable item 300 when no stress is applied thereon. In one example, the wearable item 300 is implemented as a spectacle frame (as shown in FIGS. 4 and 5) and the hook is arranged on a right-side temple (or arm) of the spectacle frame. In such an example, subsequent to folding the temples, such as, by folding the left-side temple followed by the right-side temple of the spectacle frame, the hook arranged on the right arm is coupled to the left arm and subsequently, to the spectacle frame, to enable storage of the spectacle frame in a folded state. It will be appreciated that such coupling of the arms with the spectacle frame using the hook, prevents an elasticity of the inner core 330 (or the outer layer 340) from opening or expanding the temples of the spectacle frame when no stress is applied on the wearable item 300.

Moreover, the inner core 330 is permanently deformed when strained by application of stress above the second elastic limit. For example, the wearable item 300 is required to be bent and further, retain the bent state during use of the wearable item 300 (such as, based on a required design of the wearable item 300). In one example, when a user of the wearable item 300 is required to store the wearable item 300 in a folded state, the user applies stress on the elongate member 310 to fold the wearable item 300. In such an example, the applied stress is more than the second elastic limit of the inner core 330. Furthermore, such application of stress enables permanent deformation of the inner core 330 and thereby, enables the wearable item 300 to retain the folded state. Optionally, the outer layer 340 is associated with a higher elastic limit then the second elastic limit of the inner core 330. For example, the first elastic limit is greater than the second elastic limit. In such an example, when the inner core 330 experiences the permanent deformation by application of stress above the second elastic limit, the outer layer 340 is maintained in an elastic state such that upon removal of the applied stress, the outer layer 340 is operable to return to an original state thereof. In another example, a person responsible for producing or providing repair services for the wearable item 300, applies a stress above the second elastic limit on the inner core 330 to cause such permanent deformation of the inner core 330, such as, for fabricating or repairing the wearable item 300

In one embodiment, the inner core 330 is strained by application of a stress for enabling the wearable item 300 to be at least one of worn by the user, stored in a folded state, or unfolded for use. For example, the wearable item 300 is required to be unfolded for use, such as expanded at the regions 350a-d, to enable the wearable item 300 to be worn by the user. In such an example, the user removes stress on the inner core 330, to enable such an unfolding. In another example, the user is operable to apply a stress to enable the wearable item 300 to be worn by the user. In such an example, subsequent to being arranged on wrist of the user, the user applies a stress for unfolding the wearable item 300. Such an application of stress enables the wearable item 300 to be fastened to the wrist of the user. Optionally, the user fastens a buckle (not shown) provided on distal ends of the elongate member 310 to fasten securely the wearable item 300 onto the user's wrist. In yet another example, the wearable item 300 is required to be stored in a folded state, such as, in a box or casing. In such an example, the user applies stress on the wearable item 300 to fold or compress the wearable item, to enable storage thereof in the folded state. In one embodiment, the at least one outer layer 340 experiences a permanent deformation when strained by application of stress above the first elastic limit. For example, the wearable item 300 is fabricated using an elongate member 310 comprising the inner core 330 surrounded by the outer layer 340. Furthermore, the outer layer 340 is associated with a lower elastic limit as compared to a second elastic limit associated with the inner core 330. In such an example, when the wearable item 300 is strained by application of stress on the elongate member 310, wherein the applied stress is above the first elastic limit of the outer layer 340, the outer layer 340 is operable to experience permanent deformation. Moreover, the inner core 330 is maintained in an elastic state such that the inner core 330 returns to an original state thereof subsequent to removal of the stress applied on elongate member 310.

According to an embodiment, both the inner core 330 and the outer layer 340 experience a permanent deformation when the elongate member 310 is strained by application of stress above the first and second elastic limits. For example, the inner core 330 and the outer layer 340 are associated with substantially the same elastic limits (for example, "substantially the same" as defined in the foregoing). Furthermore, the wearable item 300 is fabricated using a straight elongate member 310 including the inner core 330 accommodated within the outer layer 340, wherein both the inner core 330 and the outer layer 340 are implemented as unitary components. In such an example, stress is applied on the elongate member 310, such as, on the inner core 330 and outer layer 340, to bend (or provide a curved shape to) the elongate member 310. Furthermore, the applied stress is more than the second elastic limit associated with the inner core 330 and the outer layer 340. It will be appreciated that such application of stress causes permanent deformation of both the inner core 330 and the outer layer 340 (and consequently, the elongate member 310).

According to an embodiment, the at least one elongate member 310 is strained by application of stress above the first elastic limit and the second elastic limit for at least one of fabricating the wearable item 300, adapting the wearable item 300 for a user, and/or repairing the wearable item 300. In one example, the stress is applied to modify a shape of the elongate member 310 according to a required shape of the wearable item 300, such as, based on an ornamental design of the wearable item 300. In another example, stress is applied on the elongate member 310 to adapt the wearable item 300 according to dimensions required by a user thereof. In one example, stress is applied on the elongate member 310 to repair the wearable item 300. For example, the wearable item 300 may have been improperly deformed (such as, improperly bent or twisted) due to application of stress thereon. In such an example, a stress is applied on the elongate member 310 to restore the wearable item 300 to an original state thereof.

In one embodiment, at least one of the inner core 330 and the outer layer 340 is strained by application of a stress above the first elastic limit and/or the second elastic limit, to enable the wearable item 300 to be at least one of: worn by a user, stored in a folded state, and unfolded for use. For example, the wearable item 300 implemented as the wristwatch, is fabricated to have a shape corresponding to an open state thereof (such that the open state is associated with an original state of the wearable item 300), wherein the shape is maintained by the wristwatch when no stress is applied thereon. In such an example, upon attachment of the wristwatch on a wrist of a user, a stress is applied on the elongate member 310 to close the wristwatch, to enable the wristwatch to be gripped on the wrist of the user in a closed state. Moreover, such an application of a stress causes straining of at least one of the inner core 330 and the outer layer 340 above the first and second elastic limits, causing a permanent deformation of at least one the inner core 330 and the outer layer 340. It will be appreciated that such retaining of the wearable item 300 by permanent deformation of at least one of the inner core 330 and the outer layer 340 does not necessitate use of an attachment arrangement, such as a hook or a clamp, for retaining the wearable item in the closed state. In one example, when the user is required to detach the wristwatch from the wrist thereof, the user applies a stress on the elongate member 310 in an opposite direction as compared to the stress applied for attachment of the wristwatch on the wrist of the user. Furthermore, the stress applied on the elongate member 310 is above the first and second elastic limits of at least one of the inner core 330 and the outer layer 340. In such an example, the elongate member 310 is permanently deformed, to being the wristwatch from the closed state (associated with the wristwatch being retained on the wrist of the user) to the open state thereof. In another example, the user applies a stress on the elongate member 310 to fold the wristwatch (such as, to enable the wristwatch to be stored in a box or a casing). In such an example, the elongate member 310 is permanently deformed by an application of a stress above the first elastic limit and/or the second elastic limit of at least one of the inner core 330 and the outer layer 340, to enable the wristwatch to attain the folded state. In yet another example, when the user wants to unfold the wristwatch for use, the user is operable to apply stress on the elongate member 310 in an opposite direction as compared to the stress applied for folding the wristwatch, wherein the applied stress is above the first and second elastic limits of at least one of the inner core 330 and the outer layer 340. In such an example, at least one of the inner core 330 and the outer layer 340 are permanently deformed, wherein such permanent deformation enables the wristwatch to retain the unfolded state. Optionally, application of the stress on the elongate member 310 causes a permanent deformation of both the inner core 330 and the outer layer 340.

Figure 3B:
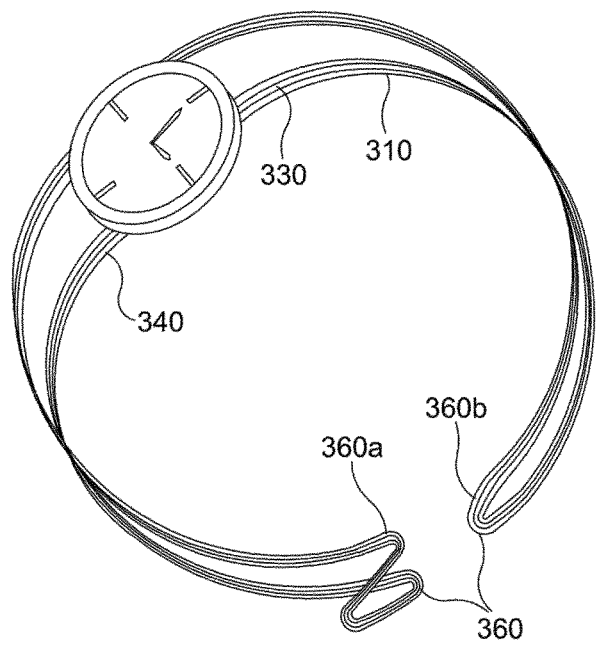

Referring to FIG. 3B, there is shown the exemplary wearable item 300 of FIG. 3A, in accordance with another embodiment of the present disclosure. The wearable item 300 is implemented as a wrist-wearable item, such as a wristwatch. As shown, the wearable item 300 includes a bendable closure arrangement 360. The bendable closure arrangement 360 includes a first element 360*a* and a second element 360*b*, such that the first element 360*a* and the second element 360*b* are fabricated as distal ends of straps of the wristwatch (formed by the elongate member 310). The elongate member 310 including the inner core 330 surrounded by the outer layer 340 is implemented as a unitary component. Furthermore, the user is operable to attach the elongate member 310 onto the wrist thereof and subsequently, and then to loop the first element 360*a* through the second element 360*a*. Moreover, the user applies a stress on the first element 360*a* to strain a looped portion of the first element 360*a* through the second element 360*b*. It will be appreciated that such straining enables to form a bend of the first element 360*a* around the second element 360*b* and consequently, enables the user to securely fasten the wristwatch around the wrist thereof. Referring to FIG. 4, there is shown an exemplary wearable item 400 (such as the wearable item 300 of FIG. 3A), in accordance with an embodiment of the present disclosure. As shown, the wearable item 400 is implemented as a pair of spectacles including the at least one attachable element implemented as a pair of lenses 410*a* and 410*b* for left and right eyes of a user, and a frame 420 for supporting the pair of lenses 410*a* and 410*b*, wherein the frame 420 includes arms 430*a* and 430*b* are engageable onto ears (pinna) of the user. The frame 420 is fabricated from the elongate member (such as the elongate member 310 of FIG. 3A). Furthermore, the elongate member is fabricated from an inner core 440 (such as the inner core 330 of FIG. 3A) that is surrounded by at least one outer layer 450 (such as the at least one outer layer 340 of FIG. 3A). In one embodiment, the at least one outer layer 450 is implemented as a unitary component. For example, the frame 420 is fabricated by applying stress on an elongate member implemented using a straight wire. Furthermore, the wire is surrounded by the outer layer 450 implemented as a unitary tubular structure, such as a straight hollow tube. In such an example, the elongate member implemented using the straight wire and the straight hollow tube is bent in a required shape of the frame 420. Optionally, the stress is applied on the elongate member using a wire bending machine.

As shown, the elongate member is formed to support the lenses 410*a* and 410*b* at a lower and/or upper peripheral edge of the lenses 410*a* and 410*b*, wherein at least a portion of the peripheral edge of the lenses 410*a* and 410*b* is supported by the frame 420. Furthermore, the elongate member is formed into an upward arch 460 at a region of the pair of spectacles that are supported by a nose of a user when the pair of spectacles is being worn by the user. In an embodiment, the lenses 410*a* and 410*b* are attachable onto the frame 420 in a detachable clip-on manner. For example, the lenses 410*a* and 410*b* are provided with tubular lens rims 470*a* and 470*b* having an axial opening (not shown). Furthermore, the lens rims 470*a* and 470*b* have an inner diameter that is substantially the same (for example, "substantially the same" as defined in the foregoing) as an outer diameter of the elongate member. In such an example, the elongate member is accommodated into the lens rims 470*a* and 470*b* and thereby, the lens rims 470*a* and 470*b* enable attachment of the lenses 410*a* and 410*b* onto the frame 420. In one example, the lens rims 470*a* and 470*b* are fabricated using plastics materials, polymer or nylon. In another example, the lens rims 470*a* and 470*b* are fabricated using additive manufacturing techniques, such as 3D printing. Optionally, the elongate member accommodates, in a attachable/detachable clip-on manner, one or more additional attachable elements (not shown) such as sunglasses, 3D glasses, magnification devices (such as a magnifying lens) and/or a miniature head-up display. For example, the additional attachable element is provided with lens rims having a bigger internal diameter than the external diameter of the lens rims 470*a* and 470*b*. In such an example, the additional attachable element is arranged over the lenses 410*a* and 410*b* on the wearable item 400 and is pivoted, when in use, to bring the additional attachable element (such as the miniature head-up display) into a field of view of the lenses 410a and 410b, when the wearable item 400 is in use by the given user.

In an embodiment, at least one of the inner core 440 and the at least one outer layer 450 is fabricated from a hyperelastic metal alloy and/or a flexible polymeric material. For example, the inner core 440 is fabricated from substantially elastic spring steel. In another example, the outer layer 450 is fabricated using metal including, but not limited to, brass, Aluminium, Aluminium alloy, Titanium, Titanium alloy, oxygen-free Copper, Indium alloys (such as Nickel-Indium alloys), enamel-coated Copper; using plastics materials; using a hyperelastic metal alloy, such as ElastaMet™ hyperelastic single crystal metal alloy; and/or using a polymer, including, but not limited to, polypropylene, silicone, polyethylene, nylon, polyvinylchloride (PVC), radiation-hardened polymeric material.

Referring to FIG. 5, there is shown an exemplary wearable item 500 (such as the wearable item of FIG. 4), in accordance with an embodiment of the present disclosure. As shown, the wearable item 500 is implemented as a pair of spectacles including a frame 510 (such as the frame 420 of FIG. 4), wherein the frame 510 includes arms that engage, when in use, onto ears (pinna) of a user of the wearable item 500. Furthermore, the frame 510 is fabricated from an elongate member. The elongate member is fabricated from an inner core 520 that is surrounded by at least one outer layer 530. As shown, the outer layer 530 includes at least one gap 540 radially arranged on the elongate member. For example, the gap 540 is formed by separation (such as, by cutting) of the outer layer 530 along a circumference thereof.

According to an embodiment, the at least one gap 540 is formed between a first element 530a and a second element 530b of the at least one outer layer 530 that are coupled in a mutually pivotal manner using the inner core 520, wherein torsional adjustment of the inner core 520 enables pivotal movement of the second element 530b and the first element 530a. As shown, the second element 530b is associated with arms of the pair of spectacles and the first element is associated with a portion of the pair of spectacles that is configured to support lenses of the wearable item 500. The pivotal movement between the second element 530b and the first element 530a enables the pair of spectacles to be unfolded, such as, for use by a user and/or folded, such as, for storage. Furthermore, such folding and/or unfolding of the pair of spectacles is achieved by application of a stress on the arms of the frame 510 while holding a remainder of the frame 510 in a stationary state. Such an application of a stress on the arms of the frame 510 causes torque to be applied on the inner core 520, causing torsional adjustment (such as, twisting) thereof. It will be appreciated that such torsional adjustment enables the pivotal movement between the second element 530b and the first element 530a. In one embodiment, one or more abutting ends of the first element 530a and/or the second element 530b slip rotationally, when in use, with respect to the inner core 520 for accommodating torsional adjustment of the inner core 520. Such slipping of the abutting ends of the first element 530a and/or the second element 530b with respect to the inner core 520 enables a reduction of a stress applied on the outer layer 530 due to the application of stress on the inner core 520. Furthermore, the pair of spectacles includes a nose pad support arrangement 550 that is attachable, in an attachable/detachable clip-on manner, onto the frame 510. For example, the nose pad support arrangement 550 is implemented using nose pads that are attached to tubular rims (such as the lens rims 470a and 470b of FIG. 4) having an axial opening (not shown). In such an example, the nose pads are attached to the frame 510 by accommodating the elongate member into the tubular rims through the axial opening. According to an embodiment, the pair of spectacles includes a temple tip arrangement (not shown) that is attachable, in an attachable/detachable clip-on manner, onto the frame 510. For example, the temple tip arrangement is implemented using temple tips that are attachable onto the frame 510 at distal ends thereof (such as, at ends of the elongate member).

In an example embodiment, one or more characteristics of the at least one outer layer 530 vary along a length of the elongate member, wherein the one or more characteristics include at least one of a flexibility of the at least one outer layer 530, a thickness of the at least one outer layer 530, a material composition of the at least one outer layer 530, and a cross-section of the at least one outer layer 530. For example, the first element 530a and/or the second element 530b is implemented using a plurality of portions having an equal length that are separated by equidistant gaps arranged along the elongate member. In such an example, portions of the first element 530a and/or the second element 530b that are arranged near the gap 540 are implemented using a material having a higher elastic limit (and yield stress), flexibility, thickness and/or cross-section as compared to other portions arranged along the elongate member.

Figure 6:
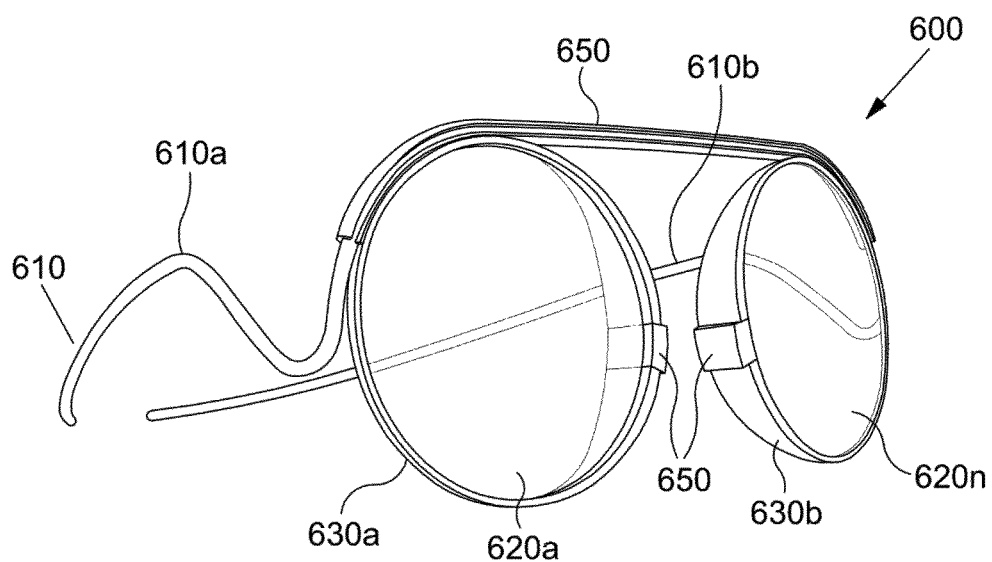

Referring to FIG. 6, there is shown an exemplary wearable item 600 (such as the wearable item of FIG. 4), in accordance with an embodiment of the present disclosure. As shown, the wearable item 600 is implemented as a pair of spectacles including a frame 610 (such as the frame 420 of FIG. 4). Furthermore, the frame 610 is fabricated from an elongate member. The elongate member is fabricated from an inner core (not shown) that is surrounded by at least one outer layer (not shown), for example a plurality of outer layers, alternatively a single outer layer. The frame 610 includes arms 620a and 620b that engage, when in use, onto ears (pinna) of a user of the wearable item 600. As shown, the arms 610a and 610b of the frame 620 optionally form a continuous wave-shaped structure, namely implemented as a unitary component. Furthermore, the wearable item 600 includes at least one attachable element which is implemented as a pair of lenses 620a and 620b for left and right eyes of a given user, respectively. The pair of lenses 620a and 620b are enclosed by lens rims 630a and 630b, respectively. Furthermore, both the lens rims 630a and 630b are attached to a tubular structure 640 in a manner that the lens rims 630a and 630b and the tubular structure 640 forms a unitary component. The tubular structure 640 has an axial opening that receives, when in use, the elongate member therein. Furthermore, the wave-shaped structure of the arms 610a and 610b is positioned on temples of the user when the user wears the pair of spectacles. Beneficially, such a wave-shaped structure provides an enhanced stability to the pair of spectacles when worn by the user. As depicted in FIG. 6, a width of the lens rims 630a and 630b is less in region near to wave-shaped structure of arms 610a and 610b, whereas a width of the lens rims 630a and 630b is more near to the region which rests on a nose of the user, when worn by the user. According to an embodiment, the pair of spectacles includes a nose pad support arrangement 650 that is attachable, in an attachable/detachable clip-on manner, onto the lens rims 630a and 630b. Alternatively, the nose pad support arrangement 650 and the lens rims 630a and 630b are implemented as a unitary component. Optionally, the nose pad support arrangement 650 is fabricated using additive manufacturing techniques, such as 3D printing.

Figure 7:
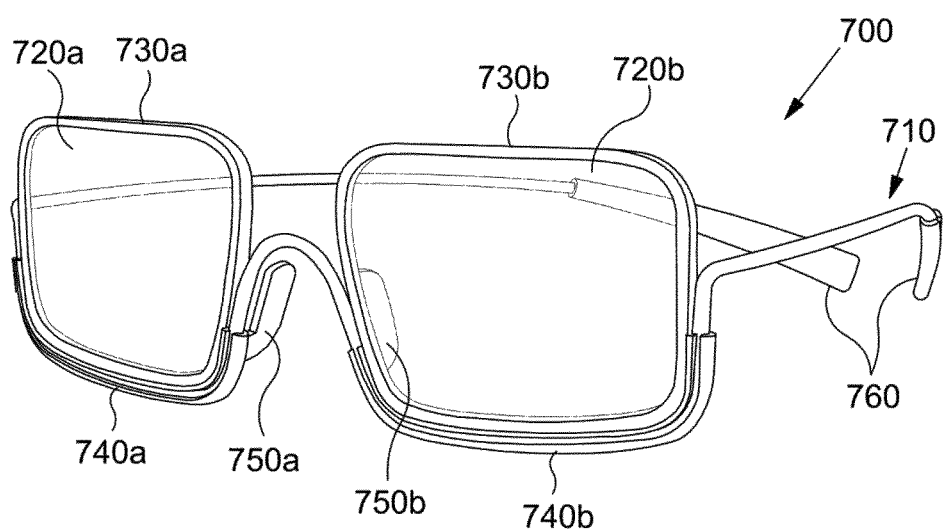

Referring to FIG. 7, there is shown an exemplary wearable item 700 (such as the wearable item of FIG. 4), in accordance with an embodiment of the present disclosure. As shown, the wearable item 700 is implemented as a pair of spectacles including a frame 710 (such as the frame 420 of FIG. 4), wherein the frame 710 includes arms that engage, when in use, onto ears (pinna) of a user of the wearable item 700. Furthermore, the frame 710 is fabricated from an elongate member. The elongate member is fabricated from an inner core (not shown) that is surrounded by at least one outer layer (not shown), for example a plurality of outer layers, alternatively a single outer layer. As shown, the wearable item 700 includes at least one attachable element which is implemented as a pair of lenses 720a and 720b for left and right eyes of a user, respectively. The pair of lenses are enclosed by lens rims 730a and 730b, respectively. Furthermore, the lens rims 730a and 730b are fabricated in a manner to include a tubular structure 740a and 740b at a lower peripheral edge of the lens rims 730a and 730b, respectively. Furthermore, the tubular structure 740a and 740b has an axial opening to receive the elongate member therein, when in use. Furthermore, the lens rims 730a and 730b further comprise nose pads 750a and 750b, respectively. Referring to FIG. 7, it is shown that the nose pads 750a and 750b are manufactured as an integral part of the lens rims 730a and 730b, respectively. As shown, the pair of spectacles includes a temple tip arrangement 760 that is attachable, in an attachable/detachable clip-on manner, onto the frame 710. The temple tip arrangement 760 is implemented using temple tips that are attachable onto the frame 710 at distal ends thereof (such as, at ends of the elongate member). Optionally, the temple tip arrangement 760 is fabricated using additive manufacturing techniques, such as 3D printing.

Figure 8:
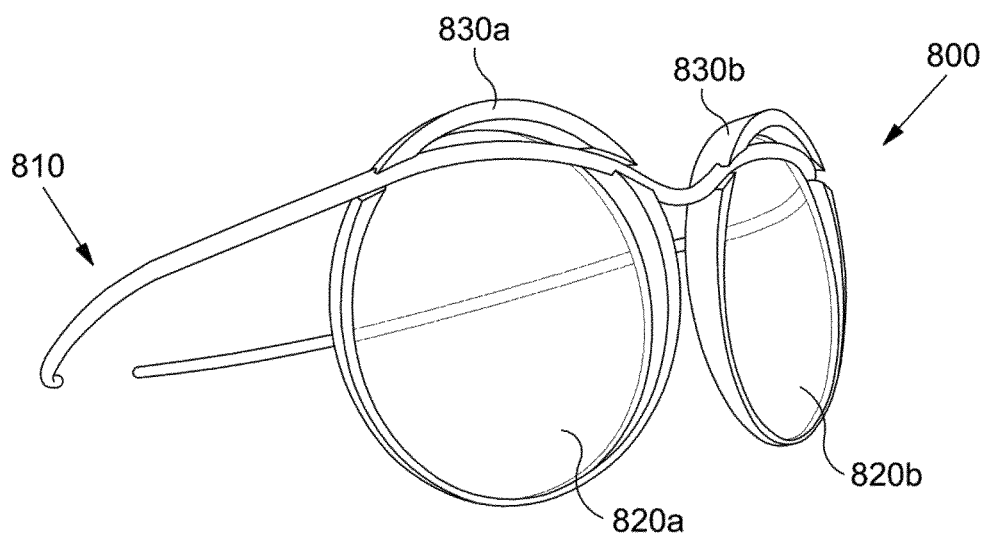

Referring to FIG. 8, there is shown an exemplary wearable item 800 (such as the wearable item of FIG. 4), in accordance with an embodiment of the present disclosure. As shown, the wearable item 800 is implemented as a pair of spectacles including a frame 810 (such as the frame 420 of FIG. 4), wherein the frame 810 includes arms that are engage, when in use, onto ears (pinna) of a user of the wearable item 800. The frame 810 is fabricated from an elongate member. The elongate member is fabricated from an inner core (not shown) that is surrounded by at least one outer layer (not shown), for example a plurality of outer layers, alternatively a single outer layer. Furthermore, the wearable item 800 includes at least one attachable element which is implemented as a pair of lenses 820a and 820b for left and right eyes of a user. The pair of lenses 820a and 820b are enclosed, namely encircled, by lens rims 830a and 830b, respectively. Optionally, the pair of lenses 820a and 820b are fabricated in an oval, rectangular or circular shape. The lens rim 830a has two cavity sections at an upper peripheral edge such that the elongated member can be accommodated therein to support the lens rim 830a. Similarly, the lens rim 830b has two cavity sections on the upper peripheral edge thereof, such that the elongate member can be accommodated therein to support the lens rim 830b. The size of the cavity should be in accordance with the outer diameter of the frame 810 to accommodate and hold the frame 810 therein firmly.

As depicted in FIG. 8, a width of the lens rims 830a and 830b varies circumferentially. Specifically, the width of the lens rims 830a and 830b decreases while moving circumferentially from the upper peripheral edge towards a lower peripheral edge of the lens rims 830a and 830b in a manner that a width of the upper peripheral edge is significantly greater than a width of the lower peripheral edge. Such an increased thickness at the upper peripheral edge of the lens rims 830a and 830b provides a larger area for the cavity and thereby provides a strong grip to the frame 810.

Figure 9:
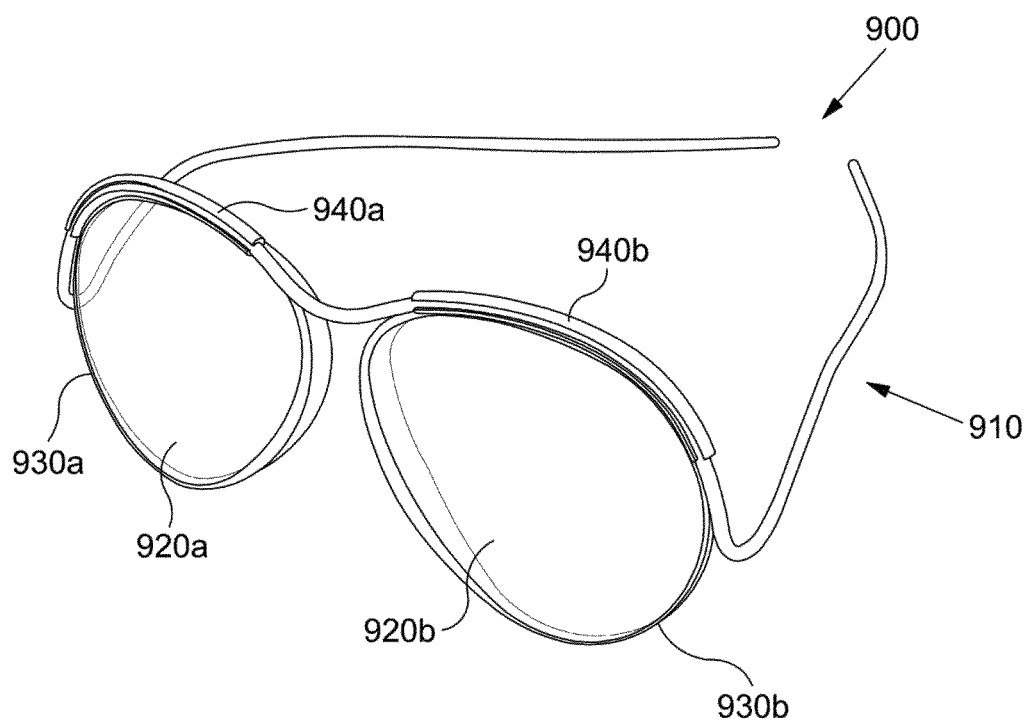

Referring to FIG. 9, there is shown an exemplary wearable item 900 (such as the wearable item of FIG. 4), in accordance with an embodiment of the present disclosure. As shown, the wearable item 900 is implemented as a pair of spectacles including a frame 910 (such as the frame 420 of FIG. 4). Furthermore, the frame 910 is fabricated from an elongate member. The elongate member is fabricated from an inner core (not shown) that is surrounded by at least one outer layer (not shown), for example a plurality of outer layers, alternatively a single outer layer. Furthermore, the wearable item 900 includes at least one attachable element implemented as a pair of lenses 920a and 920b for left and right eyes of a user. The pair of lenses 920a and 920b are enclosed, namely encircled, by lens rims 930a and 930b respectively. As shown, the lens rims are manufactured to comprise of a tubular structure 940a and 940b at an upper peripheral edge of the lens rims. The tubular structure 940a and 940b have an axial opening which accommodates the elongate member therein. Such a tubular structure 940a is advantageous in terms of holding the lens rims with the elongate member in a detachable manner, thereby providing an advantage of portability to the wearable item 900, in accordance with an embodiment of the present disclosure.

Figure 10A:
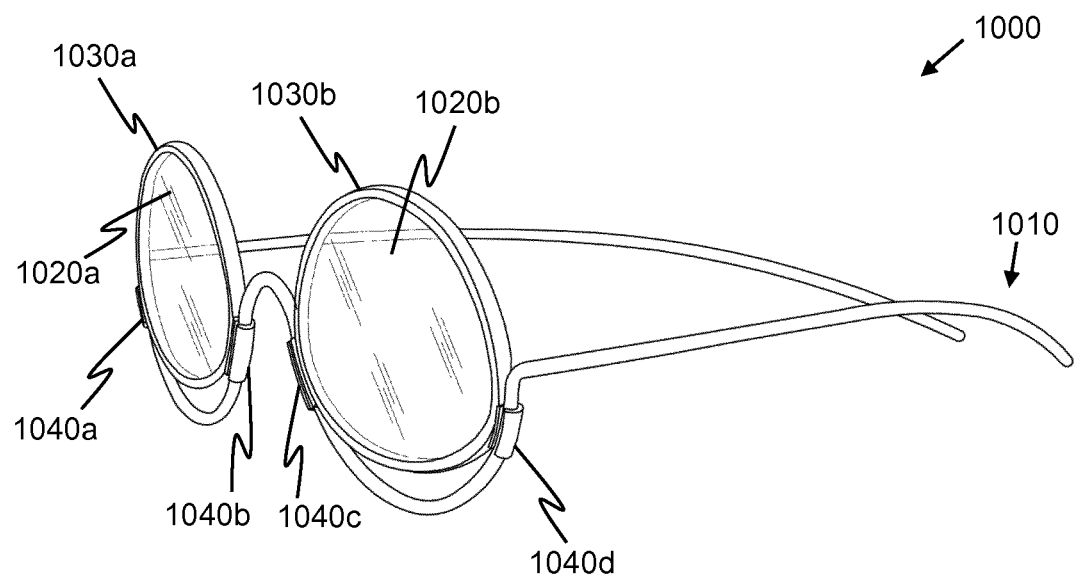
Figure 10B:
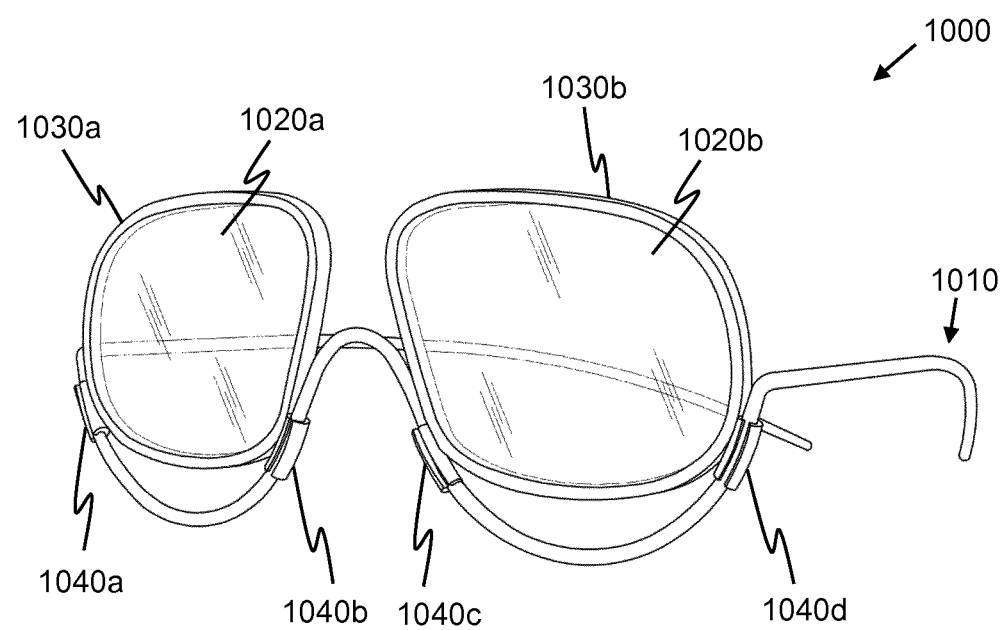

Referring to FIGS. 10A and 10B, there is shown an exemplary wearable item 1000 (such as the wearable item of FIG. 4), in accordance with an embodiment of the present disclosure. As shown, the wearable item 1000 is implemented as a pair of spectacles including a frame 1010 (such as the frame 420 of FIG. 4), wherein the frame 1010 includes arms that engages, when in use, onto ears (pinna) of a user of the wearable item 1000. Furthermore, the frame 1010 is fabricated from an elongate member. Optionally, the elongate member is fabricated from an inner core (not shown) that is surrounded by at least one outer layer (not shown), for example a plurality of outer layers. As shown, the wearable item 1000 includes at least one attachable element which is implemented as a pair of lenses 1020a and 1020b for left and right eyes of a user. The pair of lenses are enclosed, namely encircled, by lens rims 1030a and 1030b respectively. Optionally, the pair of lenses 1020a and 1020b and lens rims 1030a and 1030b can be fabricated in an oval, rectangular, circular or any closed shape having unbroken contours Furthermore, the lens rims 1030a and 1030b are fabricated in a manner to include small tubular structures 1040a, 1040b and 1040c, 1040d on periphery of the lens rims 1030a and 1030b respectively. Furthermore, small tubular structures 1040a, 1040b, 1040c, 1040d have an axial opening that receives the elongate member therein. Optionally, the small tubular structures 1040b and 1040c are fabricated in a manner such that they can act as nose pads. Moreover, it is shown that the lens rims 1030a and 1030b are attached to the elongate member with the help of the small tubular structures 1040a, 1040b and 1040c, 1040d in a manner such that, there is a small gap between the lens rims 1030a and 1030b and the elongate member.

Figure 11:
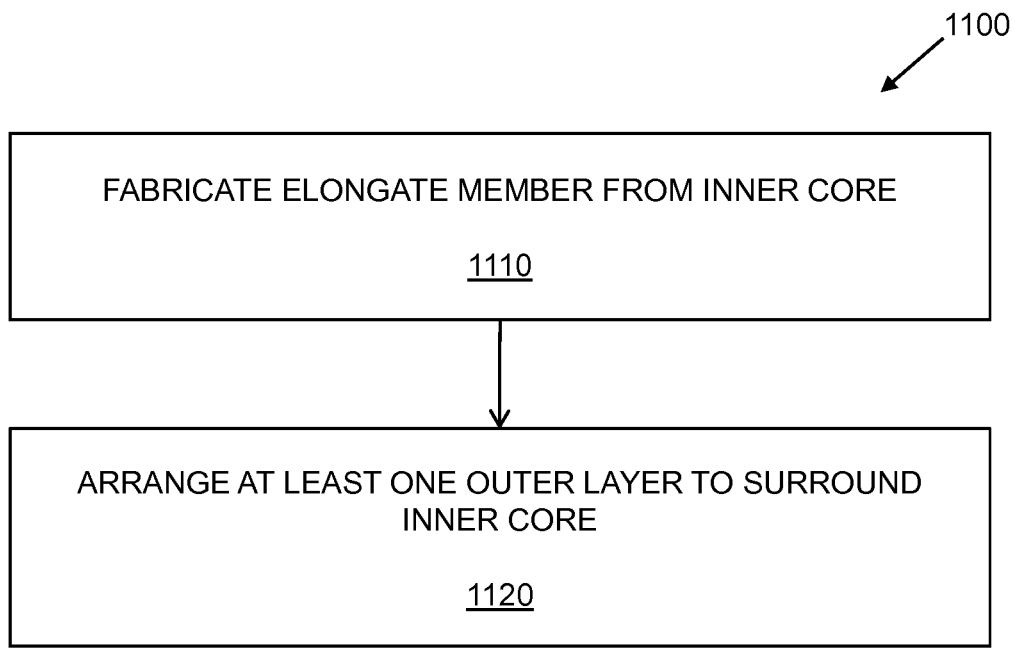
FIG. 11 is an illustration of steps of a method of manufacturing a wearable item, in accordance with an embodiment of the present disclosure.

Referring to FIG. 11, there are shown steps of a method 1100 of manufacturing a wearable item, in accordance with an embodiment of the present disclosure. The wearable item includes at least one elongate member for supporting at least one attachable element. At a step 1110, the elongate member is fabricated from an inner core. At a step 1120, at least one outer layer, for example a plurality of outer layers, alternatively a single outer layer, is arranged to surround the inner core. Furthermore, the at least one outer layer is elastic when strained by application of stress below a first elastic limit and the inner core is elastic when strained by an application of a stress below a second elastic limit or permanently deformed when strained by application of stress above the second elastic limit. By employing a plurality of outer layers, a more controllable permanently deformable shape can be achieved more easily by the user, especially when making fine adjustments. Conversely, a single outer layer is faster and easier to manufacture.

The steps 1110 to 1120 are only illustrative and other alternatives can also be provided where one or more steps are added, one or more steps are removed, or one or more steps are provided in a different sequence without departing from the scope of the claims herein. In an example, the at least one outer layer experiences a permanent deformation when strained by application of stress above the first elastic limit. In one example, the method further includes a step of forming at least one gap on the at least one outer layer, wherein the at least one gap is radially arranged on the elongate member. In another example, the method includes forming the at least one gap between a first element and a second element of the at least one outer layer that are coupled in a mutually pivotal manner using the inner core, wherein torsional adjustment of the inner core enables pivotal movement of the second element and the first element. In yet another example, the method includes straining the at least one elongate member by application of stress for enabling the wearable item to be at least one of: worn by the user, stored in a folded state, and unfolded for use.

In an example, the method includes straining the at least one elongate member by the application of the stress above the first elastic limit and the second elastic limit for at least one of: fabricating the wearable item, adapting the wearable item for a user, and repairing the wearable item. In another example, the inner core has a diameter D, and the at least one outer layer has a thickness T, characterized in that T is in a range of 0.25 D to 3.0 D, more optionally in a range of 0.5 D to 2.0 D, more optionally in a range of 0.1 D to 0.8 D. In yet another example, the inner core is implemented as a bundle of a plurality of elongate components.

In one example, that the at least one outer layer is tubular. In another example, one or more characteristics of the at least one outer layer vary along a length of the elongate member, wherein the one or more characteristics include at least one of a flexibility of the at least one outer layer, a thickness of the at least one outer layer, a material composition of the at least one outer layer, and a cross-section of the at least one outer layer. In yet another example, the method includes fabricating at least one of the inner core and the at least one outer layer from a hyperelastic metal alloy and/or a flexible polymeric material.

In an example, the method includes implementing the wearable item as a pair of spectacles including the at least one attachable element implemented as a pair of lenses for left and right eyes of a user, and a frame for supporting the pair of lenses, wherein the frame includes arms that are configured to engage onto ears (pinna) of the user, characterized in that the frame is fabricated from the elongate member, the elongate member is formed to support the lenses at a lower and/or upper peripheral edge of the lenses, wherein at least a portion of the peripheral edge of the lenses is supported by the frame, and the elongate member is formed into an upward arch at a region of the pair of spectacles that are supported by a nose of the user when the pair of spectacles is being worn by the user. In another example, the method includes attaching the lenses onto the frame in a detachable clip-on manner. In yet another example, the pair of spectacles includes a nose pad support arrangement that is attachable onto the frame in a detachable clip-on manner.

In one example, the elongate member includes an inner core implemented as a unitary component.

The hinge arrangement of the present disclosure is implemented using the inner core surrounded by the at least one outer layer, for example a plurality of outer layers, alternatively a single outer layer. Such a hinge arrangement substantially eliminates a need of moving components that are required to be provided in a small form factor. It will be appreciated that such elimination of the moving components reduces drawbacks associated with conventional hinges, such as wear and tear, and rusting of the hinges, thereby, providing increased operating life of the hinge arrangement. Furthermore, the wearable item includes at least one elongate member for supporting at least one attachable element. Such a wearable item enables folding and/or unfolding the wearable item based on the applied stress. It will be appreciated that such folding and/or unfolding of the wearable item based on the applied stress enables convenient operation of the wearable item by a given user. Moreover, based on the applied stress being more than the elastic limit of the inner core, the wearable item can be easily and conveniently fabricated, such as, using a unitary elongate member. Furthermore, components for attaching the attachable elements can be fabricated by using manufacturing techniques such as 3D printing, thereby, reducing wastage of material associated with subtractive manufacturing techniques employed for fabricating conventional wearable items. Moreover, the wearable item may be easily and cost-efficiently adapted for different users based on application of the stress above the elastic limit of the inner core. Furthermore, the wearable item can be repaired without accruing substantial costs, such as, by bending or twisting of an improperly bent elongate member. Therefore, the hinge arrangement for the wearable item and the wearable item of the present disclosure enables to overcome substantially various drawbacks associated with conventional hinges and enables to provide an improved, cost-effective and reliable wearable item having a longer operating life.

In respect of a manner of use of the embodiments shown in FIG. 10A and FIG. 10B, the lens rims and the shape of the pair of lenses are designed to allow the user an easier interaction with, for example, a mobile device. At times, looking at a screen (phone or tablet) through tinted lenses is not convenient and users tend to take their glasses/sunglasses off when doing that. In such a situation, the user can just look beneath the lens, and their associated lens rims, without a need to remove a frame of the embodiments. Optionally, a viewing gap is provided below each lens, for an orientation of the embodiments when worn, for such view of, for example, the mobile device. Optionally, the viewing gap is included between a lower portion of a given lens and the frame.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

I claim:

1. A wearable item that includes at least one elongate member for supporting at least one attachable element, wherein the elongate member is fabricated from an inner core that is surrounded by at least one outer layer, and wherein;
   the at least one outer layer is elastic when strained by application of a stress below a first elastic limit, wherein the at least one outer layer experiences a permanent deformation when strained by application of a stress above the first elastic limit;
   the inner core is elastic when strained by application of a stress below a second elastic limit, and permanently deformed when strained by application of a stress above the second elastic limit;
   the inner core is strained by application of stress for enabling the wearable item to be at least one of: worn by a user, stored in a folded state, unfolded for use; and
   the at least one elongate member is strained by application of stress above the first elastic limit and the second elastic limit for at least one of: fabricating the wearable item, adapting the wearable item for the user, repairing the wearable item,
wherein the inner core is implemented as a bundle of a plurality of elongate components; and
wherein the plurality of elongate components is helically twisted about a central axis or in a plaited state or in an untwisted state.

2. A wearable item of claim 1, wherein the at least one outer layer includes at least one gap radially arranged on the at least one elongate member.

3. A wearable item of claim 2, wherein the at least one gap is formed between a first element and a second element of the at least one outer layer that are coupled in a mutually pivotal manner using the inner core, and wherein torsional adjustment of the inner core enables pivotal movement of the second element and the first element.

4. A wearable item of claim 3, wherein one or more abutting ends of the first element and/or the second element are configured (namely operable) to slip rotationally with respect to the inner core for accommodating torsional adjustment of the inner core.

5. A wearable item of claim 1, wherein the inner core has a diameter D, and the at least one outer layer has a thickness T, and wherein T is in a range of 0.25 D to 3.0 D, more optionally in a range of 0.5 D to 2.0 D, more optionally in a range of 0.1 D to 0.8 D.

6. A wearable item of claim 1, wherein wearable item is implemented as at least one of a necklace, a pair of spectacles, an arm band and so forth.

7. A wearable item of claim 1, wherein the at least one outer layer is tubular.

8. A wearable item of claim 1, wherein one or more characteristics of the at least one outer layer varies along a length of the elongate member, and wherein the one or more characteristics include at least one of:
   (i) a flexibility of the at least one outer layer;
   (ii) a thickness of the at least one outer layer;
   (iii) a material composition of the at least one outer layer; and
   (iv) a cross-section of the at least one outer layer.

9. A wearable item of claim 1, wherein at least one of the inner core and the at least one outer layer is fabricated from a hyperelastic metal alloy and/or a flexible polymeric material.

10. A wearable item of claim 1, wherein the wearable item is implemented as a pair of spectacles including the at least one attachable element implemented as a pair of lenses for left and right eyes of a user, and a frame for supporting the pair of lenses, and wherein the frame includes arms that are configured to engage onto ears of the user, and wherein:
    (i) the frame is fabricated from the elongate member;
    (ii) the elongate member is formed to support the lenses at a lower and/or upper peripheral edge of the lenses, wherein at least a portion of the peripheral edge of the lenses is supported by the frame; and
    (iii) the elongate member is formed into an upward arch at a region of the pair of spectacles that are supported by a nose of the user when the pair of spectacles is being worn by the user.

11. A wearable item of claim 10, wherein the lenses are attachable onto the frame in a detachable clip-on manner.

12. A wearable item of claim 10, wherein the pair of spectacles includes a nose pad support arrangement that is attachable onto the frame in a detachable clip-on manner.

13. A wearable item of claim 1, wherein the elongate member includes the inner core implemented as a unitary component.

14. A wearable item of claim 1, wherein the at least one outer layer is implemented as a unitary component.

15. A wearable item of claim 1, wherein the wearable item comprises a hinge arrangement, and wherein the hinge arrangement includes an inner core surrounded by at least one outer layer,
    wherein the at least one outer layer is elastic when strained by application of a stress below a first elastic limit, wherein the at least one outer layer experiences a permanent deformation when strained by application of a stress above the first elastic limit; and
    wherein the inner core is elastic when strained by application of a stress below a second elastic limit, and permanently deformed when strained by application of a stress above the second elastic limit.

16. A wearable item of claim 15, wherein the inner core is implemented as a bundle of a plurality of elongate components.

17. A method of manufacturing a wearable item of claim 1, including at least one elongate member for supporting at least one attachable element, wherein the method includes:
    (i) fabricating the elongate member from an inner core; and
    (ii) arranging at least one outer layer to surround the inner core; and wherein:
       the at least one outer layer is elastic when strained by application of a stress below a first elastic limit, wherein the at least one outer layer experiences a permanent deformation when strained by application of a stress above the first elastic limit.

* * * * *